(12) United States Patent
Carels

(10) Patent No.: US 6,352,738 B1
(45) Date of Patent: Mar. 5, 2002

(54) DIVERTICULITIS-SPARING NUT-BASED SNACK PRODUCTS AND METHOD OF MAKING

(76) Inventor: Henry A. Carels, 5322 Abbey, Rochester, MI (US) 48306

( * ) Notice: Subject to any disclaimer, the term of this patent is extended or adjusted under 35 U.S.C. 154(b) by 0 days.

(21) Appl. No.: 09/526,815

(22) Filed: Mar. 15, 2000

Related U.S. Application Data

(60) Provisional application No. 60/126,403, filed on Mar. 26, 1999.

(51) Int. Cl.[7] ................................................ A23L 1/36
(52) U.S. Cl. ........................... 426/632; 426/2; 426/518; 426/808; 424/499
(58) Field of Search ........................... 426/632, 2, 808, 426/518; 424/499

(56) References Cited

U.S. PATENT DOCUMENTS

| | | |
|---|---|---|
| 4,049,833 A | 9/1977 | Gannis et al. |
| 4,113,889 A | 9/1978 | Baxley |
| 4,177,296 A | 12/1979 | Mochizuki et al. |
| 4,308,289 A | 12/1981 | Huisman et al. |
| 4,328,217 A | 5/1982 | Gabby et al. |
| 4,355,051 A | 10/1982 | Pominski et al. |
| 4,362,759 A | 12/1982 | Harris |
| 4,466,987 A | 8/1984 | Wilkins et al. |
| 4,568,557 A | 2/1986 | Becker et al. |
| 4,639,374 A * | 1/1987 | Matsunobu et al. ........ 426/632 |
| 4,659,583 A | 4/1987 | Hashimoto et al. |
| 4,661,363 A | 4/1987 | Gannis |
| 4,667,015 A | 5/1987 | May |
| 4,673,578 A | 6/1987 | Becker et al. |
| 4,744,995 A | 5/1988 | Robinson |
| 4,800,097 A | 1/1989 | Morris et al. |
| 4,938,987 A | 7/1990 | Gannis et al. |
| 5,079,027 A | 1/1992 | Wong et al. |
| 5,164,217 A | 11/1992 | Wong et al. |
| 5,498,438 A | 3/1996 | Strong et al. |
| 5,536,524 A | 7/1996 | Miller |

\* cited by examiner

Primary Examiner—Helen Pratt
(74) Attorney, Agent, or Firm—Brooks & Kushman P.C.

(57) ABSTRACT

Nut-based products are prepared by reconsolidating ground nuts of all small particle size by means of one or more consolidating binders, preferably water soluble binders. The particle size is small enough that persons having diverticulosis may eat the nut-based products without causing diverticulitis.

22 Claims, No Drawings

DIVERTICULITIS-SPARING NUT-BASED SNACK PRODUCTS AND METHOD OF MAKING

CROSS-REFERENCE TO RELATED APPLICATIONS

This application claims the benefit of U.S. provisional application Serial No. 60/126,403 filed Mar. 26, 1999.

TECHNICAL FIELD

The present invention pertains to nut-based products which can be eaten by people who have diverticulosis, without endangering diverticulitis.

BACKGROUND ART

Approximately forty million people in the United States suffer from diverticulosis, pockets in the intestines. When people subject to diverticulosis eat nut-based products and products such as tomatoes and strawberries which contain small seeds, undigested seeds and nut pieces may lodge in the pockets in the intestinal wall, serving as a source of irritation and potential infection termed "diverticulitis". People suffering from diverticulitis must strictly avoid food products containing seeds, nuts and the like. Nut products are, in general, significant causes of diverticulosis. For nuts such as peanuts, cashews, pecans, and others, the mastication process is unsuitable for delivering to the digestive system particles of a fine enough size to avoid diverticulitis. Thus, people with diverticulosis commonly cannot eat nut products including nuts themselves, nut toppings for ice cream, and the like.

Past attempts to provide nut-based products have required these products to have a wide range of particle sizes, and have required avoiding excessive "fines", i.e., small particles. For example, raw nuts have been coarsely ground and converted to a dough with water, and baked or fried as disclosed in U.S. Pat. No. 2,685,519. The coarseness of the meal is unsuitable for those suffering from diverticulosis. The '519 patent teaches away from using small particle sizes due to what it considers undesirable flavor, texture, and workability.

Canadian patent 861,445 discloses a product prepared from a high moisture slurry containing nut particles with a particle size of up to ⅛ inch (3 mm), and less than 20% of fines passing 60 mesh. The large particles are unsuitable for persons with diverticulosis.

U.S. Patent 4,800,097 discloses preparing an aqueous paste by comminuting nut meats in the presence of starch in a blender. When comminuting without being able to sieve the resultant nut pieces, the product invariably contains a proportion of nut pieces of relatively large size which can generate diverticulitis symptoms.

U.S. Patent 5,498,439, herein incorporated by reference, discloses a product similar to that of the '445 Canadian patent, but incorporates larger nut pieces in addition to small sized fines. The products of the '438 patent are fried rather than baked as in the Canadian patent.

Reconstituted nut products have been suggested. In U.S. Patent 5,498,438, a defatted, protein-rich snack product is prepared by grinding nuts so as to produce a granulate containing a major proportion of fine granulates and a minor portion of coarse granulates. The granulate is defatted by removal of oils, and then reconstituted. Unfortunately, the coarse granulates are of a size known to cause diverticulitis.

It would be desirable to provide a nut-based product which can be enjoyed by people having diverticulosis without causing the symptoms of diverticulitis, or which significantly reduces the symptoms thereof.

DISCLOSURE OF INVENTION

It has now been surprisingly discovered that diverticulitis-sparing nut-based products may be made by first grinding nuts to a particle size small enough to prevent the occurrence of diverticulitis, screening or sieving the ground product before addition of binder or afterwards to ensure freedom from larger nut pieces, and then binding together or reconsolidating these small particles into a shaped snack product, preferably one shaped like the nut from which the ground nut raw material is derived.

BEST MODE FOR CARRYING OUT THE INVENTION

The nut-based product of the present invention can be made from any nut species, i.e., hazel nut, brazil nut, macadamia nut, almonds, pecans, cashew nuts, and peanuts. This list is exemplary and not limiting, and may also include seeds such as pumpkin, sunflower, etc. The term "nut" as used herein includes seeds and similar "fruit bodies" unless otherwise specified. The nuts must be ground to a small particle size, one which is ineffective in causing diverticulitis in the majority of the people subject to this disease. Preferably, the particle size is similar to that of coarsely ground flour, but may be smaller. The nuts may be ground by any method, for example cryogenic grinding devices which are known to those in the art, sharp bladed rotating knives, disk attenuators, and the like. The particular method of grinding is not critical to the invention. Prior to or following grinding, modifications such as blanching, hydration, oil removal, or the like may be practiced. Grinding is disclosed in U.S. Pat. No. 4,659,583 which is herein incorporated by reference.

It is important, that larger sizes of nut pieces, such as those disclosed in Canadian Patent 861,445 and U.S. Pat. No. 5,498,438 are not present, otherwise the products cannot be eaten by persons having diverticulosis and who may develop diverticulitis. An important aspect of the present invention is that whole nuts are not necessary to produce the snack product, and nut pieces, which are readily available at lesser cost, may be employed. Preferably all the particles are less than 60 mesh, preferably less than 100 mesh, and most preferably less than 300 mesh. Particle sizes are preferably all below 0.05 inch, more preferably about 0.01 inch or less. The ground nuts may be sieved in the dry state or following addition of binder, i.e., in paste form. Alternatively, a grinding method may be devised which is incapable of generating a nut meal or flour with nut particles in excess of 60 mesh.

Once ground into finely divided form, the nuts must be reconsolidated. In order to reconsolidate the nuts, a binder must be added which allows the ground nut particles to adhere together into a shaped article. Numerous binders may be used, and the binders may be flavored or unflavored as desired by the manufacturer. The binders may also be non-nutritive or may have nutritive value. Numerous binder systems are known to those skilled in the food arts, including a variety of sugars, starches, gelatins, vegetable gums, and the like. Among the sugars, for example, are glucose, sucrose, fructose, and sugars which are non-nutritive or which provide lesser sweetness and/or nutritive value, i.e., sorbitol, mannitol, maltose, xylitol, and the like. Polyols such as isomalt, maltitol, and xylitol, are also suitable. These sugars may be used in their dry or molten state, and with or without water, for example as heavy syrups, and the like. In addition to sugars, starches and similar products may be used, for example, potato starch, corn starch, arrowroot starch, and the like.

Vegetable gums which may be used include gum tragacanth, gum acacia, carrageenan gum, guar gum, and the like. These gums may be used along with other binding ingredients such as sugars, starches, and the like. Gelatins may also be used, including gelatins from both animal and vegetable origin. The gelatins may be used in their unadulterated state, or may be modified with reaction with aldehydes and other ingredients which are acceptable to the food industry. In addition to these, ingredients such as carboxymethylcellulose hydroxypropylcellulose, and other comestically acceptable synthetic or natural binding agents may be used. Additional binders, and processes for consolidation, baking, and the like are disclosed in U.S. Pat. No. 5,498,438, which is incorporated for these purposes herein. Water soluble binders are preferred. Binders which rapidly dissipate, for example by enzymatic digestion in the stomach are also preferred.

Modifications to alter the nuts may be performed prior to or after grinding, or both prior to and after grinding. For example, the nuts or their finely ground granulate or coarsely ground intermediate may be blanched, defatted with solvents, defatted by removing oils under pressure, dehydrated, rehydrated, partially digested or hydrolyzed, etc. Such treatments for nuts and nut-based products are well known, and are disclosed, for example, in U.S. Pat. Nos. 4,355,051; 4,466,987; 4,362,259; 4,938,987; 5,164,217; and 5,536,524, all incorporated herein by reference.

To form the nut-based snack items, the ground nut is preferably mixed with binder and enough liquid to produce a pasty composition, which is introduced into a mold of the desired shape, and baked for a period of time necessary to remove any liquid and/or to set the binder. For example, when powdered sugar is used as the binder, or a powdered sugar analog such as sorbitol or the like are used, the mixture may be heated to above the melting point of the sugar causing it to melt and flow between the nut flour particles and then allowed to cool, binding the nut flour together. If water is present in such mixtures, for example when the sugar is applied in the form of corn syrup, molasses or the like, the heating may be continued for a period sufficient to remove enough water to cause the product to solidify upon cooling.

Because of their finely ground form, the nut products may be altered prior to their consolidation to form snacks of a more nutritive nature. For example, a portion of the oil present in the nuts may be removed prior to their consolidation by known oil removal techniques, or the oil may be partially removed and substituted by other oils which are considered more acceptable from a health standpoint, e.g., olive oil, canola oil, ω-3 or ω-6 polyunsaturated fatty acids, or even oils such as vitamin E acetate. Nutritional additives such as vitamins, minerals, natural herbs, etc., may also be added. A very important and desirable additional benefit of the subject invention products is that the rate of energy release is higher than for products having larger particle sizes.

Preferably, the shaped snack product is shaped similar to the nut from which it is derived. For example, nut-based snack products derived from peanuts are preferably shaped like a peanut, while nut-based snack products derived from cashews are preferably shaped like cashew nuts. However, it is not necessary to shape the nut-based snack products in this manner, as the latter may also be shaped as simple spheres, cubes, or even as flat or ruffled snack products. The nut-based snack product may also be manufactured as a continuous or discontinuous shaped product which may be broken up into fine reconstituted nut chunks suitable for applying to ice cream, cakes, and the like. The uncooked product may also be prepared in the form of sheets from which shaped products are cut or stamped, followed by baking, frying, or other means of consolidation. The molded or extruded shaped product, prior to reconsolidating, i.e. by baking, frying, etc., may be termed a "consolidatable green nut snack product."

The nut-based snack products may include a number of ingredients, such as barbeque or hot spices, buttery flavorings, smoked, honey mustard, cheese or other flavorings, crunchy sugar-type substances such as isomalt, and the like. Vitamins may also be added, particularly since the consolidation temperature is generally low enough to avoid loss of potency. Moreover, the nut-based snack products may be coated with chocolate, hard sugar coatings, or any other coatings commonly used in the snack industry, e.g., "honey-nut" type products.

The method of manufacturing the shaped snack articles is not overly critical, and may use any of the processes currently known or which may be developed in the future by the food industry. The nut-based snack products may be extruded under pressure into a mold, with sufficient binder in the nut to produce a nut-shaped article which can be deposited without significant breakage onto a moving conveyor and baked for a period of time to set the binder. Alternatively, the nutbased snack products may be prepared by injecting the settable binder containing nut flour mixture into a mold on a conveyor-type belt which then passes through an oven for sufficient time to cause the product to be fully bound together. The nut-based product is then removed from the belt upon cooling. A continuous belt may be used in such circumstances. A nut-based snack products may also be produced by methods similar to those of pelletizing which are used in the drug industry for manufacture of tablets such as aspirin tablets and a variety of solid tablets or lozenge materials. While the nut-based products may be fried, it is most desirable that they be baked. Consolidation may also be accomplished by use of microwaves, or, in some cases, radiant heat sources. The actual method of consolidation is not critical.

To test the concept of providing a tasty, diverticulosis-sparing nut product, nuts such as cashew nuts or peanuts are ground in a coffee grinder, Waring blender, food processor, or the like, to a particle size similar to that of coarse flour or finer, and then five parts of this nut flour mixture is combined with one part corn starch, and one half part sugar with one part water. A binder of some kind is necessary. The resulting paste is introduced into a mold. The mold used had a nut shape similar to the nut from which it was derived, preferably a cashew nut. A wooden mold was used, lined with aluminum foil. The paste was introduced into the mold, compacted under slight pressure by means of a blunt tool, and baked in an oven from 220° F. to 325° F. A baking temperature of 325° F. for about 20 minutes was found to be satisfactory. However, baking temperatures which are lower or higher may be used depending upon the binder required. For example, if a relatively low melting sugar in the powder condition is used as a binder, the baking temperature need only be slightly above the melting point of the sugar. Likewise, temperatures significantly higher than 325° F. may be desirable for products which are designed to have a slightly "cooked" or "burnt" taste. The temperature and time are easily adjustable depending upon the binder to provide a nut having the desired stability.

In commercial operation, the ground product would be sieved or otherwise treated to remove nut particles larger than 60 mesh. Alternatively, a grinding method which prevents the occurrence of larger particulates may be used. For example, U.S. Pat. No. 5,079,027 describes roll mills with "zero clearance" which can be used to prepare nut particles with particle sizes as low as 13 microns. However, it is unnecessary to produce such small sizes, and undesirable as well. In general, particle sizes less than 100 $\mu$m are not preferred. The afore-mentioned patent also describes methods for preparing intermediate particle sizes which are suitable for use in the present invention, and for this purpose is incorporated herein.

The nut flour is preferably of a particle size and particle size distribution, that at least a 50% decrease in generation of symptoms of diverticulitis in a scientifically significant study employing subjects having diverticulosis, or their animal equivalents can be demonstrated, when compared to digestion of whole nuts or of snacks prepared from mixtures containing significant amounts of nut pieces of a size of about 0.125 inch or more. More preferably, the absolute value of the decrease in the percentage of reported diverticulitis is greater than 80%, yet more preferably greater than 90%. Most preferably, there will be substantially no statistically significant correlation of symptoms of diverticulosis in a population ingesting the nut-based snack products of the present invention. This benefit is achieved by ensuring the lack of larger nut particulates.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A nut-based snack product of reconsolidated ground nuts, comprising an admixture of
   a) a flour of finely ground nut particles of one or more varieties of nut(s), said flour having a concentration of nut pieces of large particle size sufficiently low such that diverticulitis is avoided,
   b) an edible binder which is effective to reconsolidate said flour into a reconsolidated nut product,
   wherein said admixture is consolidated into a solid, reconsolidated nut-based snack product in the shape of a nut.

2. The snack product of claim 1, wherein said snack product is in the shape of a nut of one of the varieties from which the flour is derived.

3. The snack product of claim 1, wherein all nut particles of said flour pass through a size 60 mesh sieve.

4. The snack product of claim 1, further comprising modifying said nuts prior to reconsolidation.

5. The snack product of claim 4, wherein said modification comprises at least one of microwaving, baking, frying, removing oil, blanching, adding flavoring ingredients, adding nutritional additives, hydrating, or dehydrating.

6. The snack product of claim 1, wherein said binder comprises one or more of starch, sugar, gelatin, or a naturally occurring vegetable gum.

7. A process for the preparation of a diverticulitis tolerant reconsolidated nut snack product, said process comprising:
   a) selecting one or more nuts as a nut base for said nut snack product;
   b) comminuting said nut base to a fine particle size flour, said flour containing only an insubstantial number of nut particles of a size which generate symptoms of diverticulitis;
   c) optionally modifying said nut base prior to comminution or following comminution to alter the flavor and/or chemical make-up of said nut base or said flour;
   d) forming a paste from said flour and a binder;
   e) compressing said paste to form a consolidatable green nut snack product in the shape of a nut; and
   f) consolidating said green nut snack product into a solid, reconsolidated nut snack product.

8. The process of claim 7, wherein the shape of a nut corresponds to the shape of one of the nuts from which said flour is derived.

9. The process of claim 1, wherein said steps of compressing and consolidating take place simultaneously.

10. The process of claim 7, wherein said process of consolidating comprises baking or frying at elevated temperature.

11. A nut based snack product prepared by the process of claim 10.

12. The process of claim 7, wherein said binder comprises starch and water.

13. A nut based snack product prepared by the process of claim 12.

14. The process of claim 7 wherein said process of consolidating includes exposure to microwave energy.

15. The process of claim 7, wherein said green nut snack product comprises about 50–80% nut flour, 10–15% starch; 4–8% sugar, and 10–15% water.

16. A nut based snack product prepared by the process of claim 15.

17. A nut based snack product prepared by the process of claim 7.

18. The nut based snack product of claim 17, wherein at least a 50% decrease in symptoms of diverticulitis in mammals ingesting said nut based snack product are observed compared with symptoms in mammals ingesting the same nut base prior to comminution.

19. The nut based snack product of claim 17 wherein the energy release during digestion of masticated nut based snack product is more rapid than with masticated whole nuts of the same weight.

20. A process for preventing or decreasing the tendency toward symptoms of diverticulitis in a mammal subject to symptoms of diverticulitis ingesting nuts or nut products, said process comprising:
   a) comminuting nuts to a comminuted product having a particle size such that substantially no nut particles having a particle size greater than about 60 mesh are contained in the comminuted product;
   b) admixing said comminuted product with an edible aqueous binder to form a binder-containing aqueous product;
   c) compressing said paste to form a consolidatable green nut snack product in the shape of a nut;
   d) heating said binder-containing aqueous product to remove water and thereby form a solid nut product in the shape of a nut; and
   e) ingesting said solid nut product.

21. The process of claim 20 wherein the step of admixing further comprises admixing the comminuted product and edible aqueous binder with a flavoring ingredient.

22. The process of claim 20 wherein the step of admixing further comprises admixing the comminuted product and edible aqueous binder with a nutritional additive.

* * * * *